US009870471B2

(12) United States Patent
Shen et al.

(10) Patent No.: US 9,870,471 B2
(45) Date of Patent: Jan. 16, 2018

(54) COMPUTER-IMPLEMENTED METHOD FOR DISTILLING A MALWARE PROGRAM IN A SYSTEM

(71) Applicant: NATIONAL CHIAO TUNG UNIVERSITY, Hsinchu (TW)

(72) Inventors: Zong-Shian Shen, Taichung (TW); Shiuh-Pyng Shieh, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 17 days.

(21) Appl. No.: 14/329,527

(22) Filed: Jul. 11, 2014

(65) Prior Publication Data

US 2015/0058984 A1 Feb. 26, 2015

(30) Foreign Application Priority Data

Aug. 23, 2013 (TW) .............................. 102130367 A

(51) Int. Cl.
*G06F 21/56* (2013.01)
*G06F 21/52* (2013.01)
*H04L 29/06* (2006.01)

(52) U.S. Cl.
CPC .............. *G06F 21/56* (2013.01); *G06F 21/52* (2013.01); *G06F 21/562* (2013.01);
(Continued)

(58) Field of Classification Search
CPC ...... G06F 21/52; G06F 21/554; G06F 21/564; G06F 21/566; G06F 21/56; G06F 21/563;
(Continued)

(56) References Cited

U.S. PATENT DOCUMENTS 8,266,698 B1 9/2012 Seshardi et al.
8,370,931 B1 2/2013 Chien et al.
(Continued)

FOREIGN PATENT DOCUMENTS

| TW | 200917020 | * | 4/2009 |
| TW | 200917020 | A | 4/2009 |
| TW | 201227385 | A | 7/2012 |
| TW | 201232320 | A | 8/2012 |

OTHER PUBLICATIONS

Houng et al., "Machine Translation of TW200917020", Taiwan Patent Search system, Apr. 2009, date accessed Oct. 26, 2015, pp. 1-12 http://twpat5.tipo.gov.tw/tipotwousr/00002/dc.xml7776886992.*
(Continued)

*Primary Examiner* — Theodore C. Parsons
*Assistant Examiner* — Carlos M De Jesus Lassala
(74) *Attorney, Agent, or Firm* — Haynes and Boone, LLP

(57) ABSTRACT

A computer-implemented method for distilling a malware program in a system is disclosed. The computer-implemented method includes steps of receiving a known malware program sample; providing a benign program containing a first instruction set associated with a security; extracting the instruction set; tracing a program segment associated with the instruction set from the benign program using a plurality of data flow pathways; slicing the program segment into a plurality of independent data flow elements; identifying a partial program having elements identical to the plurality of independent data flow elements from the known malware program sample; and removing the partial program from the known malware program sample to distill the malware program.

13 Claims, 8 Drawing Sheets

(52) U.S. Cl.
CPC .......... *G06F 21/563* (2013.01); *G06F 21/564* (2013.01); *G06F 21/568* (2013.01); *H04L 63/145* (2013.01); *G06F 2221/2143* (2013.01)

(58) Field of Classification Search
CPC ...... G06F 21/64; G06F 21/561; G06F 21/562; G06F 21/568; G06F 2221/2143; H04L 63/145
See application file for complete search history.

(56) References Cited

U.S. PATENT DOCUMENTS

| | | | |
|---|---|---|---|
| 2007/0050755 | A1 | 3/2007 | Mizrachi et al. |
| 2008/0262985 | A1* | 10/2008 | Cretu ................... G06N 99/005 706/12 |
| 2008/0263659 | A1* | 10/2008 | Alme ...................... G06F 21/56 726/22 |
| 2010/0011441 | A1 | 1/2010 | Christodorescu |
| 2012/0072998 | A1 | 3/2012 | Agrawal |
| 2012/0124667 | A1* | 5/2012 | Chiang ................ G06F 21/566 726/24 |
| 2012/0159629 | A1 | 6/2012 | Lee et al. |
| 2012/0222120 | A1 | 8/2012 | Rim et al. |

OTHER PUBLICATIONS

Matenaar et al. "Android Analysis Framework dexter", DEXlab, May 2012, pp. 1-37 http://dexlabs.org/files/dexter-slides-sigint2012.pdf.*

Holmer, "Automatic Design of Computer instruction Sets", 1993, pp. 1-275, http://citeseerx.ist.psu.edu/viewdoc/download?doi=10.1.1.55.477&rep=rep1&type=pdf.*

Webr2, "Decompiling DEX into Java sourcecode", Aug. 2009, http://www.webr2.com/decompiling-dex-into-java-sourcecode/.*

Shen et al., "Modeling Security Relevent Semantics for Android Malware Detection", Thesis, National Chiao Tung university, Jul. 2013, pp. 1-57.*

Hoffmann et al, "Slicing Driods: Program Slicing for Smali Code", AMC digital libary, Mar. 2013, pp. 1845-1851, http://delivery.acm.org/10.1145/2490000/2480706/p1844-hoffmann.pdf?ip=151.207.250.71&id=2480706&acc=ACTIVE%20SERVICE&key=C15944E53D0ACA63%2E4D4702B0C3E38B35%2E4D4702-B0C3E38B35%2E4D4702B0C3E38B35&CFID=979572146&CFTOKEN=45564466&_acm_=15042.*

Search Report and Office Action received in Taiwanese Application No. 102130367, dated Jul. 22, 2015, 10 pages.

* cited by examiner

COMPUTER-IMPLEMENTED METHOD FOR DISTILLING A MALWARE PROGRAM IN A SYSTEM

CROSS-REFERENCE TO RELATED APPLICATION AND CLAIM OF PRIORITY

The application claims the benefit of the Taiwan Patent Application No. 102130367, filed on Aug. 23, 2013, at the Taiwan Intellectual Property Office, the disclosures of which are incorporated herein in their entirety by reference.

FIELD OF THE INVENTION

The present invention is related to a detection method for a malware program and its system, and more particularly to a detection method for a malware program and its system based on static analysis.

BACKGROUND OF THE INVENTION

Recently, the use of mobile devices has exceeded the use of personal computers. The malicious programs used to disrupt the systems on personal computers show up in a similar way on mobile devices, for example on the Android™ operating system on smartphones or tablet computers. The widespread problem of malicious programs causes the users of mobile devices to be exposed to malware threats, and fast polymorphism forces antivirus software developers to constantly be alert to ensure their users' safety against electronic attacks in the form of malware.

Malicious software detection techniques play an important role in the defense of information security. The fast polymorphism of malware has developed into a variety of disguises, making a precise detection method a necessity. The major malware detection methods on personal computer systems can be categorized into static analysis and dynamic analysis. Static analysis models the structural characteristics by extracting the control procedure of the pending program; however, benign program characteristics constantly appear in malicious program characteristics, which cause a great deal of concealment about the technique. Dynamic analysis monitors and models the runtime of the pending program, and is a common technique; however, this technique is conditioned on the quality of the simulation by the simulator in the mobile device, there is no way to observe the interaction between the malicious program and the telecom service, and there is no way to observe the interaction between the malicious program and specific elements in the mobile device.

US 20120222120 discloses a trigger action by monitoring an Application Program Interface (API) to detect malicious behavior. In this patent, the malware detection on personal computers can be applied to mobile devices. However, the instruction set in mobile devices is generally included together with the common sequence of instructions in the system. Hence, the analysis of whether the application is a malware program faces low accuracy issues either by comparing the flow graph of the malware pattern file or the flow graph of the extracted action. If the common sequences of instructions in the system are not removed from malware programs, a false alert message may easily occur.

US 20120072988 discloses a model generated during a controlled procedure and data flow in the collection of a malware program, and applies the model to detect unknown programs. This patent further provides a new technique "super block" for a more firmly built flow graph model, but this patent does not resolve interference issues constructed by the common sequences of instruction in the malware program and the system.

US 20100011441 discloses preprocessed computer programs to remove obfuscation that might prevent the detection of embedded malware to strengthen the accuracy of detection. The main purposes of this patent are unpacking of encrypted malware and reordering of the malware into a standard form. However, this patent does not resolve interference issues constructed by the common sequences of instructions in the malware program and the system.

U.S. Pat. No. 8,370,931B1 discloses a technique using dynamic behavior matching to detect malware programs. This patent designs an algorism to determine whether the system behavior is suspicious by matching sets of rules to system events caused by a particular process.

U.S. Pat. No. 8,266,698B1 discloses a technique using dynamic behavior matching to detect malware programs. This patent collects the behavioral characteristics of the users and designs an algorism to determine whether the executing application is a malware threat.

Among the aforementioned prior arts, all the semantics models of the malware program contain other normal and benign programs. As a result, the detection may not be precise enough.

In order to overcome the drawbacks in the prior art, a computer-implemented method for distilling a malware program in a system is disclosed. The particular design in the present invention not only solves the problems described above, but is also easier to implement. Thus, the present invention has the utility for the industry.

SUMMARY OF THE INVENTION

In accordance with an aspect of the present invention, a computer-implemented method for distilling a malware program in a system is disclosed. The computer-implemented method includes steps of receiving a known malware program sample; providing a benign program containing a first instruction set associated with a security; extracting the instruction set; tracing a program segment associated with the instruction set from the benign program using a plurality of data flow pathways; slicing the program segment into a plurality of independent data flow elements; identifying a partial program having elements identical to the plurality of independent data flow elements from the known malware program sample; and removing the partial program from the known malware program sample to distill the malware program.

In accordance with another aspect of the present invention, a system for determining whether a to-be-tested program is malicious is disclosed. The system receives a known malware program sample at first, and then receives a benign program for comparing the known malware program sample. The system includes a malware program distillation subsystem removing a part of the known malware program sample identical to the plurality of independent data flow elements to generate a distilled malware program; a semantics model extraction subsystem extracting a first instruction set associated with security in the benign program, tracing a program segment associated with the instruction set using a plurality of data flow pathways, and slicing the program segment into a plurality of independent data flow elements; and a malware characteristics comparison subsystem comparing the distilled malware program and the to-be-tested program, and when the two programs have a similarity reaching a specific threshold, determining that the to-be-tested program is malicious.

In accordance with a further aspect of the present invention, a method for determining whether a to-be-tested program exhibits malicious behavior is disclosed. The method includes generating a distilled malware program by removing a part of a known malware program sample having contents identical to a semantics model; establishing the semantics model by extracting a first instruction set associated with security in a non-malicious program; and comparing the distilled malware program to the to-be-tested program, and when the two programs have a similarity reaching a specific threshold, determining that the to-be-tested program is malicious.

In accordance with another aspect of the present invention, a method for determining whether a to-be-tested program is malicious is disclosed. The method includes steps of removing a part from a known malware program sample having contents identical to a semantics model to generate a distilled malware program; providing a non-malicious program containing an instruction set associated with a security; establishing the semantics model for the non-malicious program; and comparing the distilled malware program to the to-be-tested program, and when a similarity therebetween reaches a specific threshold, then determining that the to-be-tested program is malicious.

The above objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
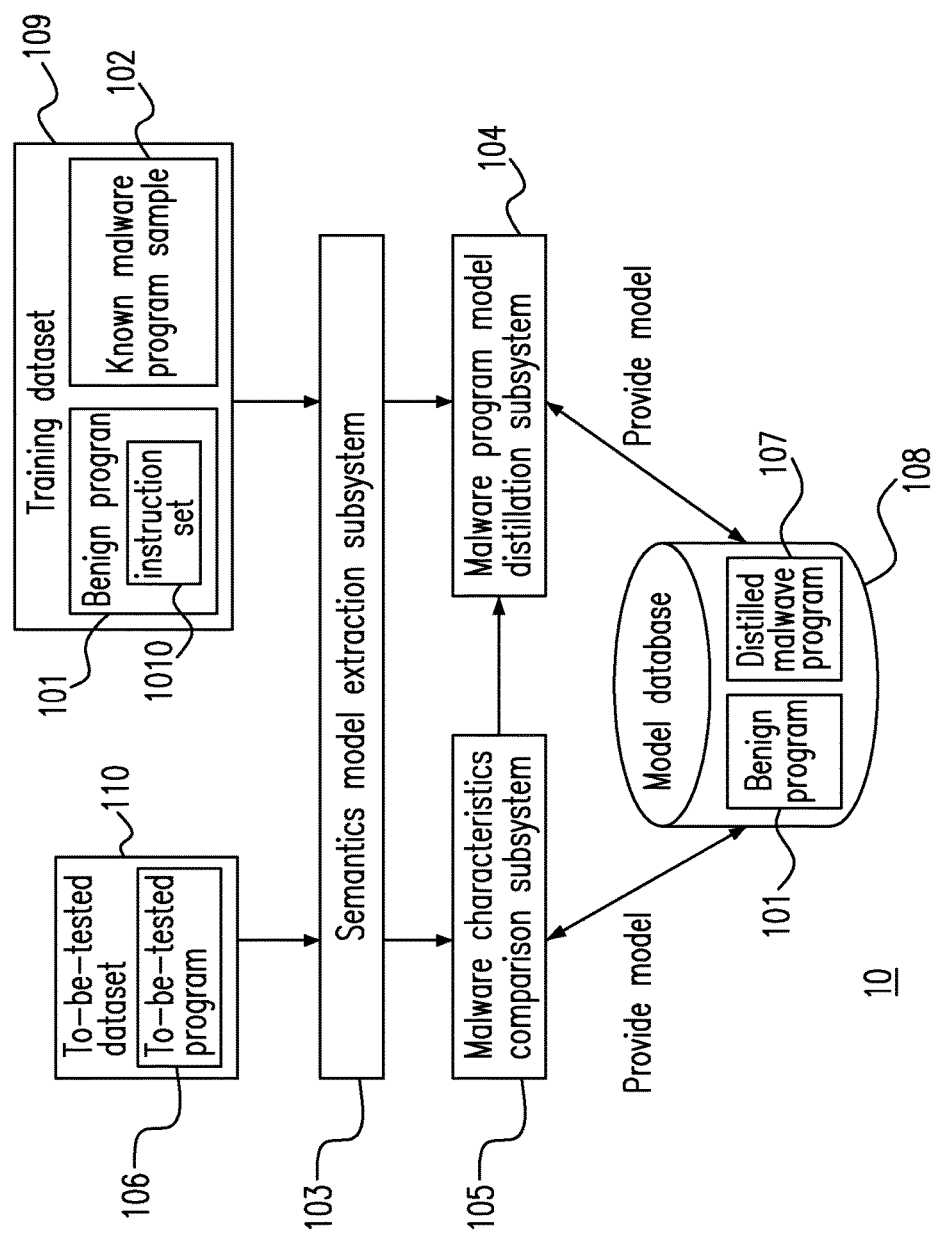
FIG. 1 shows a system for determining whether or not a to-be-tested program contains a malware program.
Figure 2:
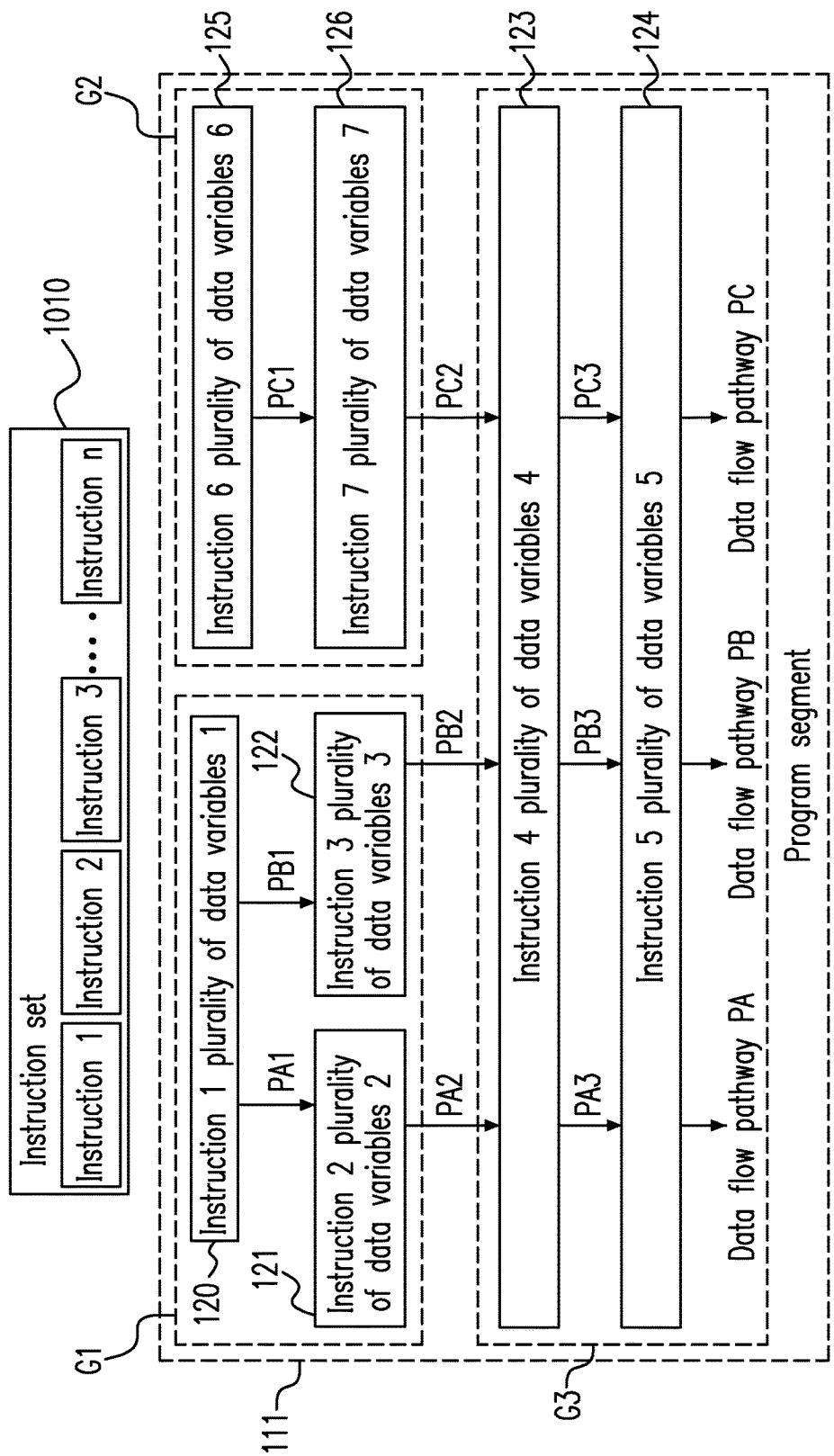
FIG. 2 shows the use of a plurality of data flow pathways to trace a program segment depending on the instruction set in the present invention.
Figure 3:
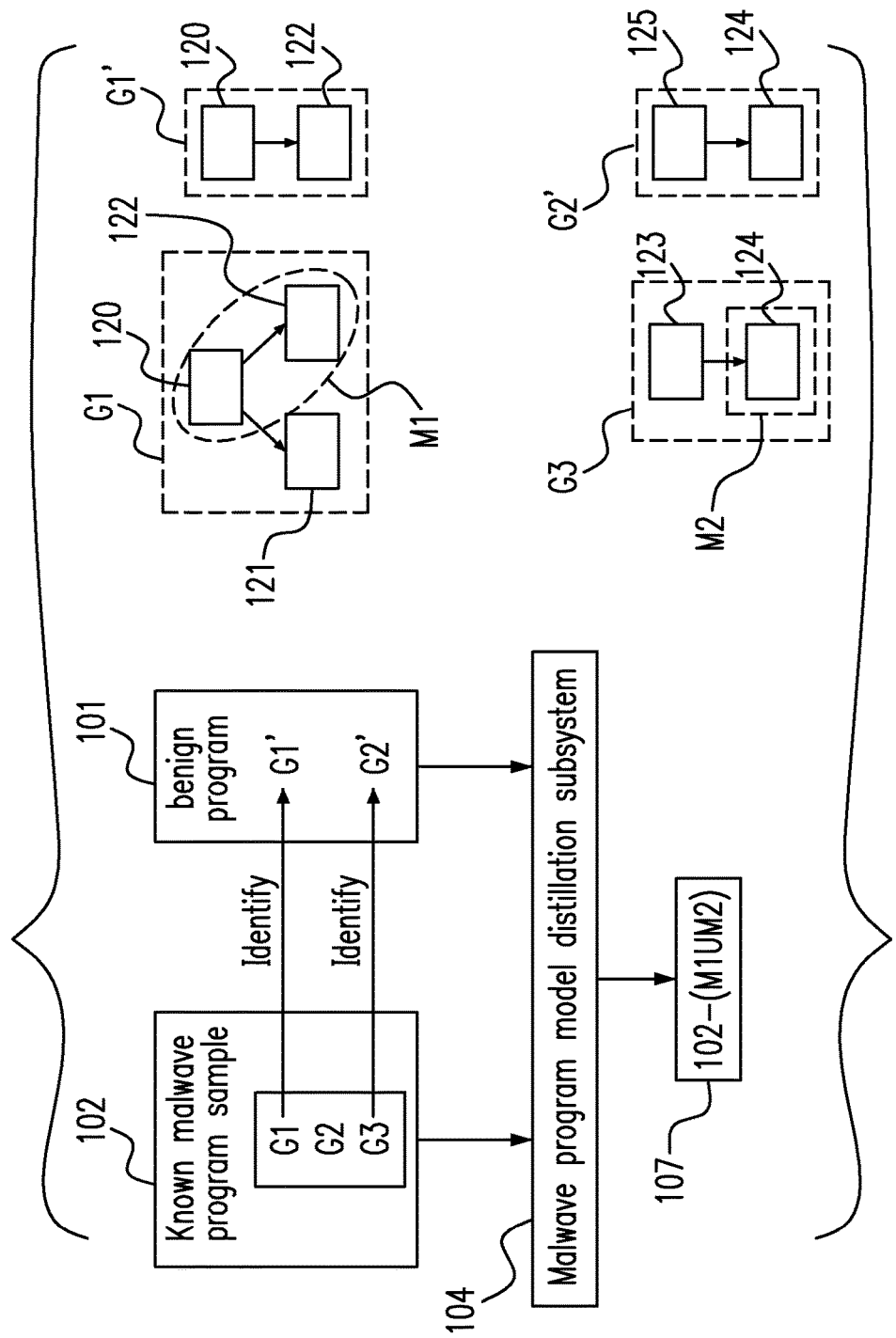
FIG. 3 shows the distillation of the known malware program in the present invention.

Please refer to FIG. 1, which shows a system 10 for determining whether or not a to-be-tested program 106 contains a malware program. Please refer to FIG. 2, which shows the use of a plurality of data flow pathways to trace a program segment depending on the instruction set in the present invention. Please refer to FIG. 3, which shows the distillation of the known malware program in the present invention. Referring to FIGS. 1-3 simultaneously, the system 10 receives a benign program 101 and a known malware program sample 102. The system 10 includes a semantics model extraction subsystem 103, a malware program distillation subsystem 104, and a malware characteristics comparison subsystem 105. The semantics model extraction subsystem 103 extracts a security related instruction set 1010 in the benign program 101, traces a program segment 111 depending on the instruction set 1010 through the plurality of data flow pathways PA, PB and PC, and slices the program segment 111 into a plurality of independent data flow elements G1, G2, and G3. The malware program distillation subsystem 104 removes the same part of the program in the plurality of independent data flow elements G1, G2, and G3 from the known malware program sample 102 to generate a distilled malware program 107. The malware characteristics comparison subsystem 105 compares the distilled malware program 107 to the to-be-tested program 106, and when the similarity between the two programs reaches a specific threshold, the malware characteristics comparison subsystem 105 determines that the to-be-tested program 106 contains the malware program. In a preferred embodiment, after the malware characteristics comparison subsystem 105 determines that the to-be-tested program 106 contains the malware program, the malware program distillation subsystem 104 can further purify the malicious program, and provide the malicious program to the model database 108 as a new sample, or provide the malicious program to the model database 108 as a new sample without further purification.

In FIG. 1, the training data set 109 includes the benign program 101 and the known malware program sample 102, and the benign program 101 is provided by the model database 108. During the training phase, the benign program 101 extracts the semantics model through the semantics model extraction subsystem 103, and the known malware program 101 extracts the semantics model through the semantics model extraction subsystem 103 as well. The to-be-tested data set 110 contains the to-be-tested program 106. After the training phase, the malware characteristics comparison subsystem 104 compares the to-be-tested program 106 to the distilled malware program 107 to determine whether the to-be-tested program 106 is malicious by examining the similarity in their data flow elements. First of all, the bytecode of the benign program 101 is disassembled to identify the instruction set 1010, wherein the instruction set 1010 set includes a privacy associated instruction set, an instruction set unprotected by a Dalvik virtual machine, and a background automatic executing instruction set. In addition, the bytecode of the known malware program sample 102 is disassembled to identify another instruction set, which can be different from the prior instruction set. The present invention aims to remove the same instruction set 1010 between the known malware program sample 102 and the benign program 101 to distill the known malware program sample 102. Because of the variety of system platforms, the disassembling of the same bytecode may result in different instructions. Generally speaking, after the disassembling, a combined linguistic code or a mechanical linguistic code can be obtained, followed by identification of the instruction set associated with the security.

When application software is running in the system, it has to gain permission to access resources, and the privacy associated instruction set would access the information related to the telecom service or the user's personal data. Therefore, a mobile operating system, such as Android™ or iOS™, asks for permission to access personal privacy data before installing the application software. Because the acts of gaining access to private data may affect information security, the management of these privacy related instruction sets is essential. In the present invention, the instruction set unprotected by a Dalvik virtual machine is presented as Fr.

Dalvik virtual machine (DVM) is an integral part of the Android™ operation system. When application software is accessing the resources inside the operating system using a DVM protected instruction set, the device or system using the operating system will be protected from, for example, buffer overflow. The DVM protected instruction set includes Java™ runtime instructions, a Java™ native interface (JNI), and Java™ Class Locator associated instructions. The Java™ runtime instructions can call the Android™ operation system directly, the JNI instructions can call the original Linux™ operating system, and the Java™ Class Loader can not only call the original Linux™ operation system but also access external resources unprotected by the DVM. In the present invention, the instruction set unprotected by DVM is denoted as FE.

With respect to the background automatic executing instruction set, this type of instruction set is capable of detecting the perimeter, or being executed automatically in the background, for example, instructions to turn on the camera and transmit the image in the background, instructions to record the keystrokes from the keyboard to steal passwords, etc. In the present invention, the background automatic executing instruction set is denoted as $F_R$.

Figure 4:
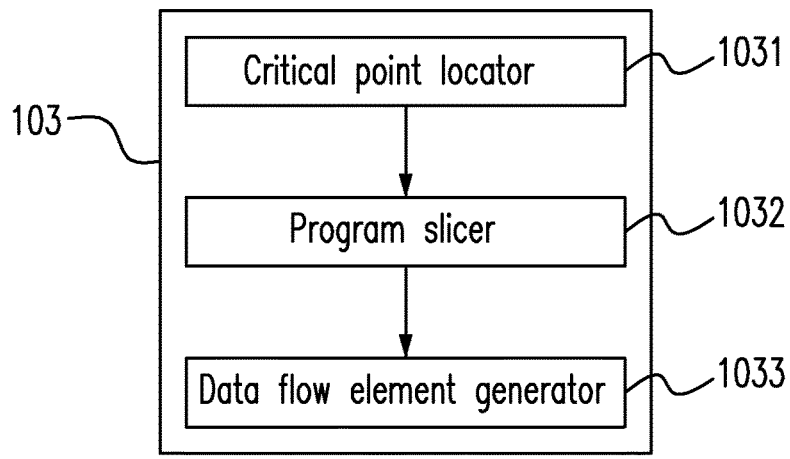
FIG. 4 shows the semantics model extraction subsystem in the present invention.

Please refer to FIG. 4, which shows the semantics model extraction subsystem 103 in the present invention. The semantics model extraction subsystem 103 further includes a critical point locator 1031, a program slicer 1032, and a data flow element generator 1033. The main function of the critical point locator 1031 is to extract the security related instruction set 1010, which is referred to as a critical point set. The critical point set is the origin of the security related semantics, and can provide further analysis. The critical point set is the instruction set 1010, denoted as $I_P$, $I_P=I_C \cup I_R$, wherein $I_C$ represents the instruction set $F_P \cup F_E$, and $I_R$ represents a set of instructions which is a part of $F_R$.

Referring to FIG. 2 and FIG. 4 simultaneously, the main contribution of program slicer 1032 is to utilize the collected critical point set to extract the instruction set 1010 that is dependent on the data. For example, the data are the plural data variables 1, 2, 3, 4, 5, 6, 7 in FIG. 2, and the instruction set 1010 are the instructions 1, 2, 3, 4, 5, 6, 7 in FIG. 2. FIG. 2 shows a plurality of data flow pathways PA, PB, and PC. There are two ways to trace the data flow pathway. One is to trace from the prior procedure, called backward slicing; the other is to trace to the next procedure, called forward slicing. In FIG. 2, the procedure of the program includes passing through nodes 120, 121, 122, 123, 124, 125, and 126. The program slicer 1032 backward slices the plurality of data flow pathways PA, PB, and PC to trace the source data directly, and identifies every pathway used to execute the source data. The program slicer 1032 can also forward slice every data unit in the plurality of data flow pathways to trace the sequential data directly, and identify every pathway used to execute the sequential data to obtain the program segment. For example, the plurality of data variables 5 is executed by instruction 5, and at least one of the plurality of data variables 5 originates from the plurality of data variables 4. Therefore, instruction 4 depends on the plurality of data variables 4 and can be extracted by the program slicer 1032. At least one of the plurality of data variables 4 originates from the plurality of data variables 2, 3, or 7. That is to say, between node 121 and node 123, node 122 and node 123, and node 126 and node 123, there are at least 3 pathways PA2, PB2, and PC2. Between node 123 and node 124, the data pathways are PA3, PB3, and PC3, and the instruction 2, 3, 7 depending on the plurality of data variables 2, 3, 7 can be extracted by the program slicer 1032. Similarly, at least one of the plurality of data variables 2 and at least one of the plurality of data variables 3 originate from at least one of the plurality of data variables 1, and instruction 1 depending on the plurality of data variables 1 can be extracted by the program slicer 1032; it can also be recognized that the data pathway between node 120 and node 121 is PA1, and the data pathway between node 120 and 122 is PB1. Because at least one of the plurality of data variables 4 originates from the plurality of data variables 7 and at least one of the plurality of data variables 7 originates from the plurality of data variables 6, the instructions 6 and 7 can be extracted by the program slicer 1032, and the data flow pathway PC1 between nodes 125 and 126 as well as the data flow pathway PC2 between nodes 126 to 123 may be recognized as well. By tracing the instructions dependent on data variables, all of the data pathways can be recognized, wherein PA=PA1→PA2→PA3, PB=PB1→PB2→PB3, PC=PC1→PC2→PC3. In addition, instructions 1 to 7 can be extracted to be used as security related instruction set 1010. The method of forward slicing is similar to that of backward slicing, and the only difference is the direction.

In another preferred embodiment, the analysis of data pathways is a combination of the following disassembled program code:
mov va, vb
  add vc, va, vb The tracing variable vc is the sum of variable va and variable vb. It can be found by backward tracing the variable va that variable va is an algebraic move of va into variable vb, and therefore it originates from variable vb. As a result, the program code of the dataflow pathways is vc←va←vb, the instruction set in use includes mov (the moving instruction) and add (the addition instruction), and the instruction set can be normalized to increase the detection rate of malware program mutation. For example, the addition instruction add can be normalized to include arithmetic operation instructions. If the addition instruction add is modified to a subtraction instruction sub or other logical polymorphism, the mutated malware program will be detected.

In FIG. 2, the algorithm for backward slicing can be expressed by the following pseudo code 1:

Input:
    Whole program CFG G=(V, E)
    Critical point ip
Output:
    Slicing graph $G_{(ip, B)}=(V_B, E_B)$
Column 1    $R^S$←TraceableSourceOperands(ip)
Column 2    PATH←AllSimplePathsEndAt(ip)
Column 3    $V_B$←$V_B \cup \{ip\}$ -continued

| | |
|---|---|
| Column 4 | |
| Column 5 | for each simple path p ∈ PATH do |
| Column 6 | S.push($R^S$) |
| Column 7 | While S≠Φdo |
| Column 8 | r←S.pop( ) |
| Column 9 | u←VertexOfferingRegister(r) |
| Column 10 | for each vertex v ∈ Predecessors(p, u) do |
| Column 11 | if r=TargetOperand(v) then |
| Column 12 | $V_B$←$V_B$∪{v} |
| Column 13 | $E_B$←$E_B$∪{(u, v)} |
| Column 14 | S.push(TraceableSourceOperands(v)) |
| Column 15 | break |
| Column 16 | return $G_{(ip, B)}$ |

The main technical idea of the first pseudo code is to examine whether the variable in the node of the current program step is identical to the variable in the node of the prior program step. If they are identical, then the node of the current program step is linked together with the node of the prior program step to become the data flow pathway, which is elaborated below. In the first pseudo code, the capital letters V, E, PATH, S, $R^S$ represent sets, the lower indicated capital B represents backward, the lowercase r represents the element in the $R^S$ set, the lowercase p represents the element in the PATH set, the bold font represents the program control flow. The control flow graph (CFG) of all of the known malware programs, including node V and arm E, enters the semantics model extraction subsystem 103, i.e. the steps 120 to 125 and data flow pathways PA, PB, PC. What enters the semantics model extraction subsystem 103 further includes the ith critical point ip, i.e. the instruction number i. The outputs are the sliced data flow elements $G_{(ip, B)}$. In a preferred embodiment of the present invention, the sliced data flow elements are G1, G2 and G3, as shown in FIG. 2. The function of the TraceableSourceOperands(ip) in column 1 is to extract the ith instruction from all the data variables in the known malware program sample 102, and save it in the stackable S temporary set $R^S$. The order of extraction can be backward, starting from the last variable in the program flow and moving forward. In column 2, the function of the AllSimplePathsEndAt(ip) is to extract one simple data pathway from the known malware program sample 102, and save it in the PATH set, e.g. the simple data pathways PA, PB, and PC. In column 3, the node set $V_B$ unions the ith instruction to become a new node set $V_B$, and from there, the 1st to ith instruction can be extracted to the node set $V_B$. In column 5, for every simple pathway p in the pathway set PATH, the program executes columns 6 to 16 repeatedly. In column 6, a variable in temporary set $R^S$ is pushed into stackable set S. In column 7, when the stackable set S is not a zero set, the program executes columns 8 to 14 repeatedly. In column 8, the variables are extracted from stackable set S and saved in the operand element r. Then in column 9, the function VertexOfferingRegister(r) extracts the variables from the temporary element r, which are saved in the temporary node u. In column 10, for every node in the prior steps of the program which is an element of the temporary node u on pathway p, the program executes columns 11 to 14 repeatedly. In column 11, if the data variable in node v of the prior steps of the program is identical to the data variable in node r of the current step, then in column 12, node v of the prior steps of the program unions to node set $V_B$, and in column 13, the data pathway between node v of the prior steps of the program and node r of the current step unions to data pathway set $E_B$. Then in column 14, the variable in the step before node v of the prior steps is pushed into the stackable set S. In column 15, the for loop command in column 10 is ended, and the program in columns 7 to 14 is executed repeatedly until the stackable set S is empty to obtain a simple data pathway. Then the program returns to execute the for loop in column 5 to obtain another simple data pathway. As a result, the program is sliced into a plurality of simple data flows, i.e. the data flows PA, PB, and PC, as shown in FIG. 2. In column 16, the program returns the graph composed by the data pathways, which contains all the nodes and arms, forming the data flow elements G1, G2 and G3. In FIG. 4, the known malware program sample 102 is processed after the critical point locator 1031 collects the instruction set 1010 that is dependent on the data, the program slicer 1032 slices the known malware program sample 102, the data flow element generator 1033 produces the data flow elements G1, G2 and G3, and the semantics model extraction is accomplished. Similarly, when the input of the semantic model extraction subsystem is the benign program 101, the data flow elements G1' and G2' will be obtained.

The program procedure in columns 10 to 15 identifies the simple data pathway, e.g. PA3→PA2→PA1. The program in column 6 further extracts another data variable, and identifies another simple data pathway, e.g. PB3→PB2→PB1, and so forth, until all the simple data pathways are identified, and then the program outputs the data flow element $G_{(ip, B)}$. In the event that the plurality of data variables 1, 2 and 3 are different from the plurality of data variables 6 and 7 in FIG. 2, i.e. there is no vertically continuous connection in the program procedure, the nodes 120, 121, 122 and the nodes 125, 126 in the data flow pathways PA, PB, and PC are mutually independent. Therefore, the nodes 120, 121, 122 and the nodes 125, 126 can be divided into the mutually independent data flow elements G1 and G2. In FIG. 2, at least one of the plurality of data variables 4 is identical to at least one of the plurality of data variables 2, and at least one of the plurality of data variables 4 is identical to at least one of the plurality data variables 7, i.e. there is a vertically continuous connection in the program procedure. However, the plurality of data variables 5 and the plurality of data variables 1, 2, 3 are mutually exclusive, and the plurality of data variables 5 and the plurality of data variables 6, 7 are mutually exclusive. Therefore, the nodes 123 and 124 form the data flow element G3 are mutually exclusive from the data flow elements G1 and G2. In another preferred embodiment, these pluralities of data variables 1 to 7 can also be a single data variable. In FIG. 1, what is input to the semantics model extraction subsystem 103 may not only contain the known malware program to obtain the data flow elements G1, G2 and G3, but the benign program 101 can also be input to the semantics model extraction subsystem 103 to obtain the data flow elements G1' and G2', as shown in FIG. 3.

In FIG. 2, similar to backward slicing, the algorithm of forward slicing can be approximately expressed as the following pseudo code 2.

| | |
|---|---|
| Input: | |
| | Whole program CFG G=(V, E) |
| | Critical point ip |
| Output: | |
| | Slicing graph $G_{(ip, B)}$=($V_B$, $E_B$) |
| Column 1 | $R^T$←TraceableTargetOperand(ip) |
| Column 2 | PATH←AllSimplePathsBeginAt(ip) |
| Column 3 | $V_F$←$V_F$∪{ip} |
| Column 4 | |
| Column 5 | for each simple path p ∈ PATH do |
| Column 6 | Q.push($R^T$) |

-continued

| | |
|---|---|
| Column 7 | While Q≠Φdo |
| Column 8 | r←Q.pop( ) |
| Column 9 | u←VertexOfferingRegister(r) |
| Column 10 | for each vertex v ∈ Successors(p, u) do |
| Column 11 | if r ∈ SourceOperands (v) then |
| Column 12 | $V_F \leftarrow V_F \cup \{v\}$ |
| Column 13 | $E_F \leftarrow E_F \cup \{(u, v)\}$ |
| Column 14 | Q.push(TraceableTargetOperand(v)) |
| Column 15 | else if r=TargetOperand(v) then |
| Column 16 | break |
| Column 17 | return $G_{(ip, B)}$ |

Forward slicing is similar to backward slicing; therefore, only the differences between the two will be specified. Regarding the program in column 15, if the data variable on the next node is identical to that on the prior node, the instruction execution of the next node would alter the value of the identical data variable, and then the tracing of the next data variable is stopped, because it is no longer related to the next node. Then in column 14, the variable in the step before node v of the prior step is pushed into stackable set S. Regarding the program in column 16, the for loop command in column 10 ends, the program goes back to the while loop command in column 7, and the program in columns 7 to 15 is executed repeatedly until the stackable set S is empty to obtain a simple data pathway. Then the program again goes back to execute the for loop in column 5 to obtain another simple data pathway. As a result, the program is sliced into a plurality of simple data flows, and finally the data flow element is obtained.

FIG. 3 demonstrates the distillation of the malware program graphically. After known malware program sample 102 and benign program 101 are processed by the semantics model extraction subsystem 103, the data flow elements G1, G2, G3 and the data flow elements G1' and G2' are generated separately. In a preferred embodiment, the program compares the data flow elements G1 and G1', and compares the data flow elements G3 and G2'. After the comparisons, it can be found that the nodes 120 and 122 of the data flow element G1 in the known malware program sample 102 are identical to those of the data flow element G1' in the benign program 102, the data flow pathways between nodes 120 and 122 are identical and the set M1 is formed. The node 124 of the data flow element G3 is identical to that of the data flow element G1' and the set M2 is formed. After removing the union of the sets M1 and M2 from the set of known malware program sample 102, the distilled malware program 107 is obtained.

In FIG. 3, the algorithm to distill the known malware program sample 102 can be expressed by the following pseudo code 3.

| | |
|---|---|
| Input: | $\Gamma_S$: a set of data flow elements of the known malware program sample 102 |
| | $\Gamma_B$: a set of data flow elements of the benign program 101 |
| Output: the distilled malware program 107 | |
| Column 1 | for each components $C_S \in \Gamma_S$ do |
| Column 2 | For each components $C_B \in \Gamma_B$ do |
| Column 3 | M←MaximunCommonSubgraph($C_S$, $C_B$) |
| Column 4 | Synthe←Synthe∪M |
| Column 5 | if NonTrivial (Synthe) then |
| Column 6 | $C_S \leftarrow C_S$-Synthe |

The pseudo code 3 is elaborated as follows. Column 1 repeatedly executes the programs from column 2 to column 6 on the set of data flow elements of the known malware program sample 102. In column 3, the program extracts the most similar part between the two data flow elements $C_S$ and $C_B$. The number of data flow elements of the known malware program sample 102 and that of data flow elements of the benign program 101 may be plural, e.g. G1 to G3 and G1' to G2', as shown in FIG. 3. The program identifies the identical part M1 by comparing G1 to G1', the program unions M1 with a synthesized set Synthe, identifies the identical part M2 by comparing G3 to G2' union M1 with a synthesized set Synthe, as shown in column 4. If the newly synthesized set Synthe is deemed significant, then the program removes the newly synthesized set Synthe from the set of the known malware program sample 102, to finally obtain the distilled malware program 107, as shown in the programming process from column 5 to column 6.

Figure 5:
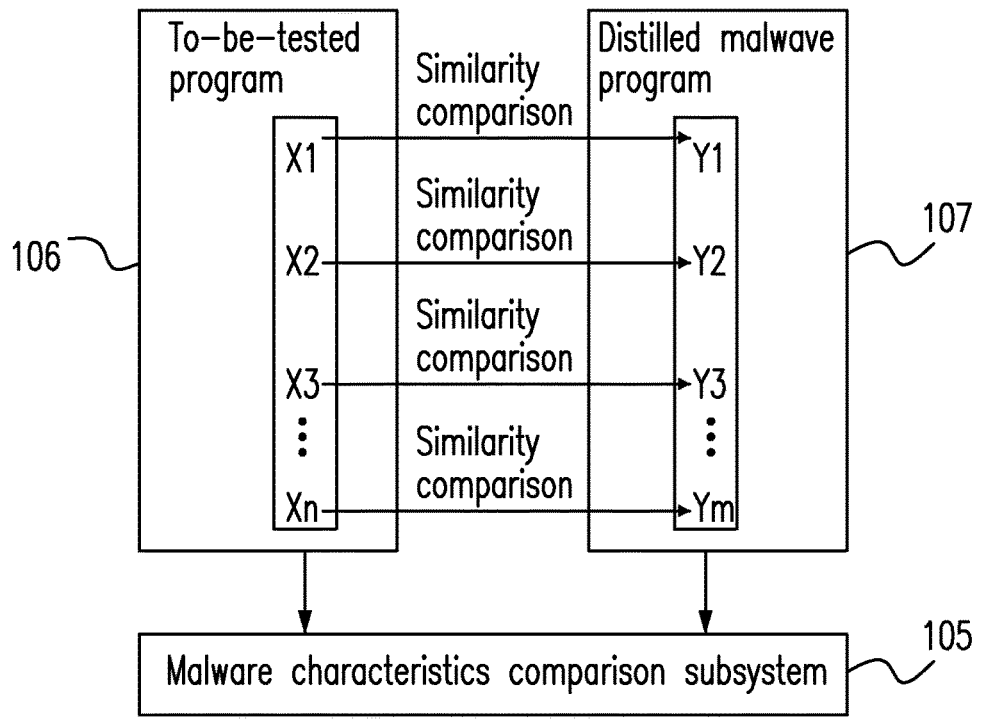
FIG. 5 shows the similarity comparison between the to-be-tested program and the distilled malware program in the present invention.

FIG. 5 shows the similarity comparison between the to-be-tested program 106 and the distilled malware program 107 in the present invention. In a preferred embodiment, after being processed by the semantics model extraction subsystem 103, the to-be-tested program 106 becomes data flow elements X1, X2, X3, . . . , Xn, and after being processed by the semantics model extraction subsystem 103, the distilled malware program 107 becomes data flow elements Y1, Y2, Y3, . . . , Yn. The data flow elements are graphs as described above by connecting the nodes and the arms, and therefore can be bipartite matched. In FIG. 5, the malware characteristics comparison subsystem 105 compares the similarity between the data flow elements X1, X2, X3, . . . , Xn and the data flow elements Y1, Y2, Y3, . . . , Ym using bipartite matching.

In FIG. 5, the bipartite matching compares the similarity of every data flow element between the to-be-tested program 106 and the distilled malware program 107. For example, the data flow element X1 is respectively compared to the data flow elements Y1, Y2, Y3, . . . , Ym, and the data flow element X2 is respectively compared to the data flow elements Y1, Y2, Y3, . . . , Ym, etc. The best match condition is when the similarity is one-to-one, e.g. the data flow element X1 is similar to the data flow element Y1, the data flow element X2 is similar to the data flow element Y2, the data flow element X3 is similar to the data flow element Y3, and the data flow element Xn is similar to the data flow element Ym. This is when the malware characteristics comparison subsystem 105 determines a match between the to-be-tested program 106 and the distilled malware program 107, i.e. the to-be-tested program 106 is malicious. A poor match condition is when the similarity is one-to-many, e.g. the data flow element X1 is similar to all the data flow elements Y1, Y2, Y3, . . . , Ym, but not the data flow element X2 and the data flow element Y2, not the data flow element X3 and the data flow element Y3, and not the data flow element Xn and the data flow element Ym. This is when the malware characteristics comparison subsystem 105 determines that there is no match between the to-be-tested program 106 and the distilled malware program 107, i.e. the to-be-tested program 106 is not malicious. The similarity between the to-be-tested program 106 and the distilled malware program 107 can be estimated by the degree of similarity. The degree of similarity=(the to-be-tested program 106 ∩ the distilled malware program 107)/(the to-be-tested program 106 ∪ the distilled malware program 107). When the degree of similarity is greater than a threshold, the malware characteristics comparison subsystem 105 determines that the to-be-tested program 106 and the distilled malware program 107 is a match.

In FIG. 5, the algorithm to compare the similarity between the to-be-tested program 106 and the distilled malware program 107 can be expressed by the following pseudo code 4.

```
Input : Cn : a set of data flow elements of the to-be-tested program 106
       Cm: a set of data flow elements of the distilled malware program
          107
Output : the similarity score between Cn and Cm
Column 1              Hn←Φ; Hm←Φ
Column 2              for each vertex v ∈ V[Cn] do
Column 3                  Pv←ExtraAllTwoStepPaths(v)
Column 4                  Hn←Hn∪djb2NgramHash(Pv)
Column 5              for each vertex v ∈ V[Cm] do
Column 6                  Pv←ExtraAllTwoStepPaths(v)
Column 7                  Hm←Hm∪djb2NgramHash(Pv)
Column 8              Score←|Hn∩Hm|/|Hn∪Hm|
```

The pseudo code 4 is elaborated as follows. In the column 1, Hn denotes the value set of the path of each node to its neighboring two nodes in the to-be-tested program, and Hm denotes the value set of the path of each node to its neighboring two nodes in the distilled malware program. In the beginning, both Hn and Hm are initialized to be empty sets. In columns 2 to 3, for each node in Cn, the path of each node is extracted to its neighboring two nodes in Cn to the pathway set Pv. In column 4, the pathways in the pathway set Pv are transformed into numeric values through the hash function djb2NgramHash, until all the pathways are transformed into numeric values to accelerate the graphic matching. In columns 5 to 6, for each node in Cm, the path of each node is extracted to its neighboring two nodes in Cm to the pathway set Pv. In column 7, the pathways in the pathway set Pv are transformed into numeric values through the hash function djb2NgramHash, until all the pathways are transformed into numeric values. Finally in column 8, the score is determined by the formula |Hn∩Hm|/|Hn∪Hm|, i.e. dividing the number of pathways that are the same by the number of all the pathways. When the score is greater than a specific threshold, it is determined that there is a match between the to-be-tested program 106 and the distilled malware program 107.

Figure 6:
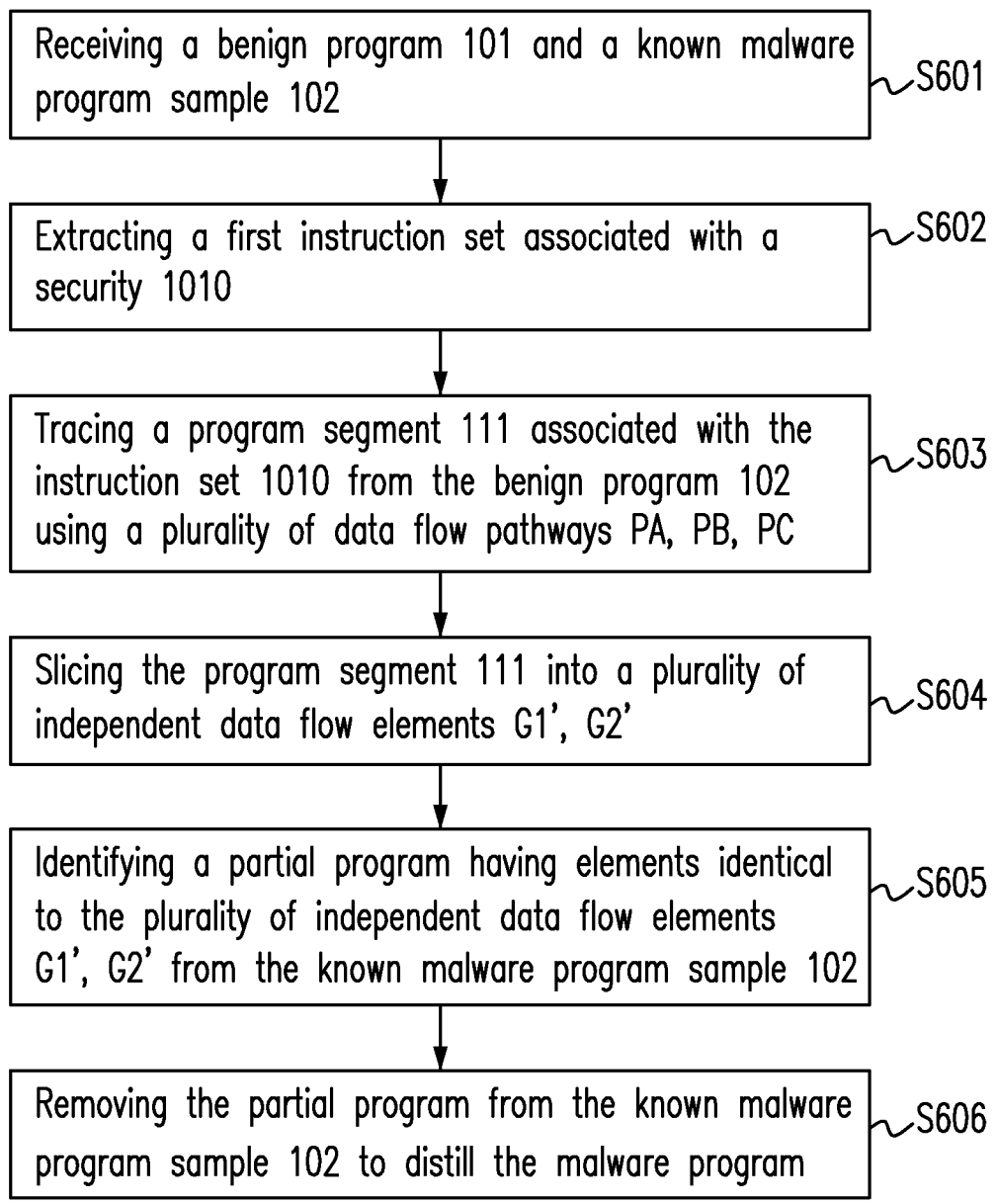
FIG. 6 shows the method for generating a distilled malware program in a system.

Please refer to FIG. 6, which shows the method for generating a distilled malware program 107 in a system 10. The method includes steps in a training phase, receiving a benign program 101 and a known malware program sample 102 in a system 10 (S601); extracting a first instruction set associated with a security 1010 in the benign program 101 (S602); tracing a program segment 111 associated with the instruction set 1010 from the benign program using a plurality of data flow pathways PA, PB and PC (S603); slicing the program segment 111 into a plurality of independent data flow elements G1' and G2' (S604); identifying a partial program (M1∪M2) having elements identical to the plurality of independent data flow elements G1' and G2' from the known malware program sample 102 (S605); and removing the partial program (M1∪M2) from the known malware program sample 102 to generate the distilled malware program 107 (S606).

Please refer to FIGS. 1, 5 and 6 simultaneously. In FIG. 6, the method further includes the following steps:

input a to-be-tested program 106 into the system 10 in a detecting phase;

divide the to-be-tested program 106 into n independent data flow elements X1, X2, X3, ... Xn, wherein the n-th data flow element of the n independent data flow elements includes an n-th flow chart, the distilled malware program 107 includes m data flow elements, Y1, Y2, Y3, ..., Ym, and the m-th data flow element of the m data flow elements includes an m-th flow chart;

compare the similarity between the 1-st to n-th flow charts and the 1-st to m-th flow charts, convert all data pathways in the n-th flow chart into a first set of values, and convert all data pathways in the m-th flow chart into a second set of values, wherein a first data pathway in the n-th flow chart is represented by a first value of the first set of values, and a second data pathway in the m-th flow chart is represented by a second value of the second set of values;

obtain a first count that the values in the first set of values and the second set of values are the same, and obtain a second count that the values in the first set of values and the second set of values are different;

obtain a similarity estimate by dividing the first count by the sum of the first count and the second count; and when the similarity estimate is greater or equal to a specific threshold, determine whether the n-th flow chart is similar to the m-th flow chart, and then bipartitely match the n data flow elements and the m data flow elements.

Depending on how the n flow charts and the m flow charts are respectively similar to each other, how malicious the to-be-tested program 106 is can be determined.

Returning to FIG. 1, the malware characteristics comparison subsystem 105 determines that the to-be-tested program 106 is malicious after comparing the to-be-tested program 106 to the distilled malware program 107 provided by the model database 108. The malware program distillation subsystem 104 can further purify the malicious program, and provide the malicious program to the model database 108 as a new sample, or provide the malicious program to the model database 108 as a new malware program sample.

Figure 7:
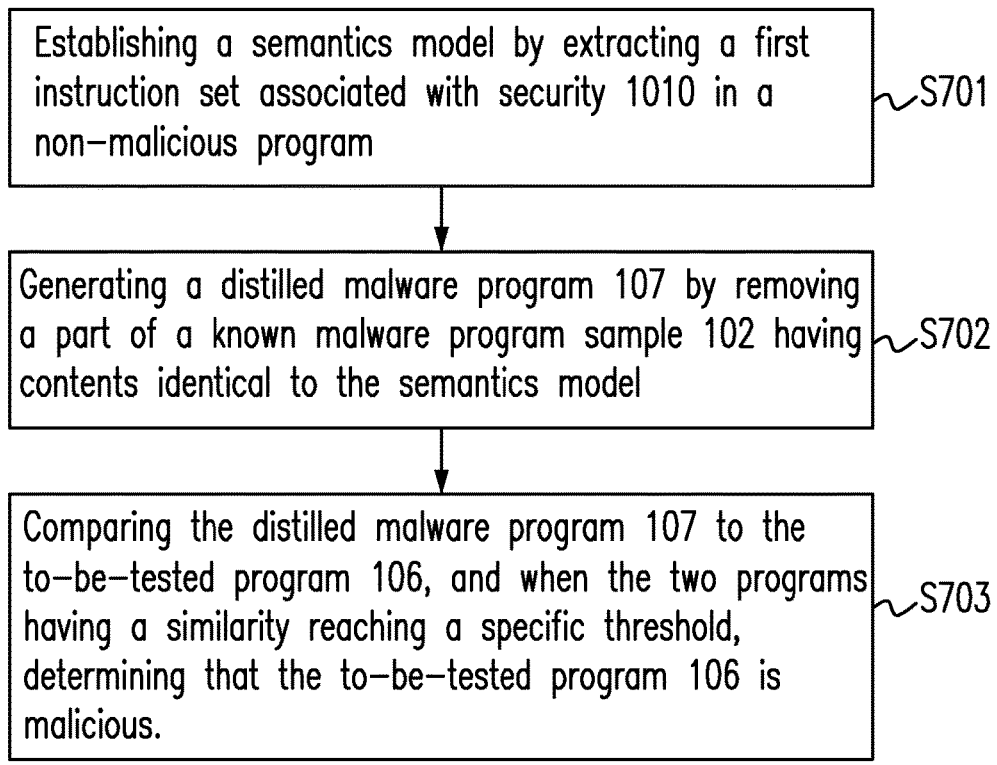
FIG. 7 shows the method for determining whether a to-be-tested program is malicious according to a first embodiment of the present invention.

Please refer to FIG. 7, which shows the method for determining whether a to-be-tested program 106 is malicious according to a first embodiment of the present invention. The method includes the steps of establishing a semantics model by extracting a first instruction set 1010 associated with security in a non-malicious program (S701); generating a distilled malware program 107 by removing a part of a known malware program sample 102 having contents identical to the semantics model (S702); and comparing the distilled malware program 107 to the to-be-tested program 106, and when the two programs have a similarity reaching a specific threshold, determining that the to-be-tested program 106 is malicious (S703).

Please refer to FIGS. 5 and 7. In a preferred embodiment, the semantic model of the to-be-tested program 106 is the union of the data flow elements X1, X2, X3, ..., Xn, the non-malicious program can be the benign program 101, the semantic model of the benign program 101 is the union of the data flow elements G1' and G2', and the semantic model of the distilled malware program 107 is the union of the data flow elements Y1, Y2, Y3, ..., Ym. The step S701 establishes the semantic model as described in step S601, step S602, step S603 and step S604. The step S702 generates the distilled malware program 107 from the known malware program sample 102 as described in FIG. 3. The step S703 is the similarity comparison between the to-be-tested program 106 and the distilled malware program 107 to determine whether the to-be-tested program 106 is malicious. The specific threshold includes a similarity estimate and a respective bipartite match. The similarity estimate is, for example, the degree of similarity. The degree of similarity= (the to-be-tested program 106 ∩ the distilled malware program 107)/(the to-be-tested program 106 ∪ the distilled malware program 107). The respective similarity is, for example, determined by the score obtained from the formula |Hn∩Hm|/|Hn∪Hm|.

Figure 8:
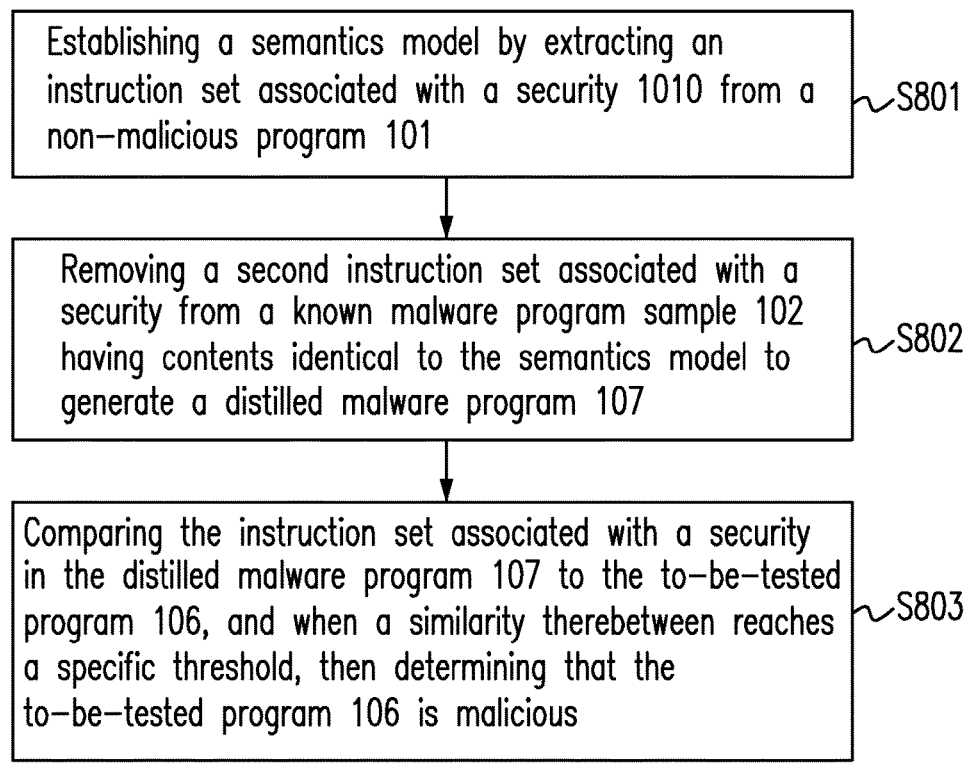
FIG. 8 shows the method for determining whether a to-be-tested program is malicious according to a second embodiment of the present invention.

Please refer to FIG. 8, which shows the method for determining whether a to-be-tested program 106 is malicious according to a second embodiment of the present invention. The method includes the steps of establishing a semantics model G1' and G2' by extracting an instruction set 1010 associated with a security from a non-malicious program 101 (S801); removing a second instruction set associated with a security from a known malware program sample 102 having contents identical to the semantics model to generate a distilled malware program 107 (S802); and comparing the instruction set associated with a security in the distilled malware program 107 to the to-be-tested program 106, and when the similarity therebetween reaches a specific threshold, then determining that the to-be-tested program 106 is malicious (S803).

Figure 9:
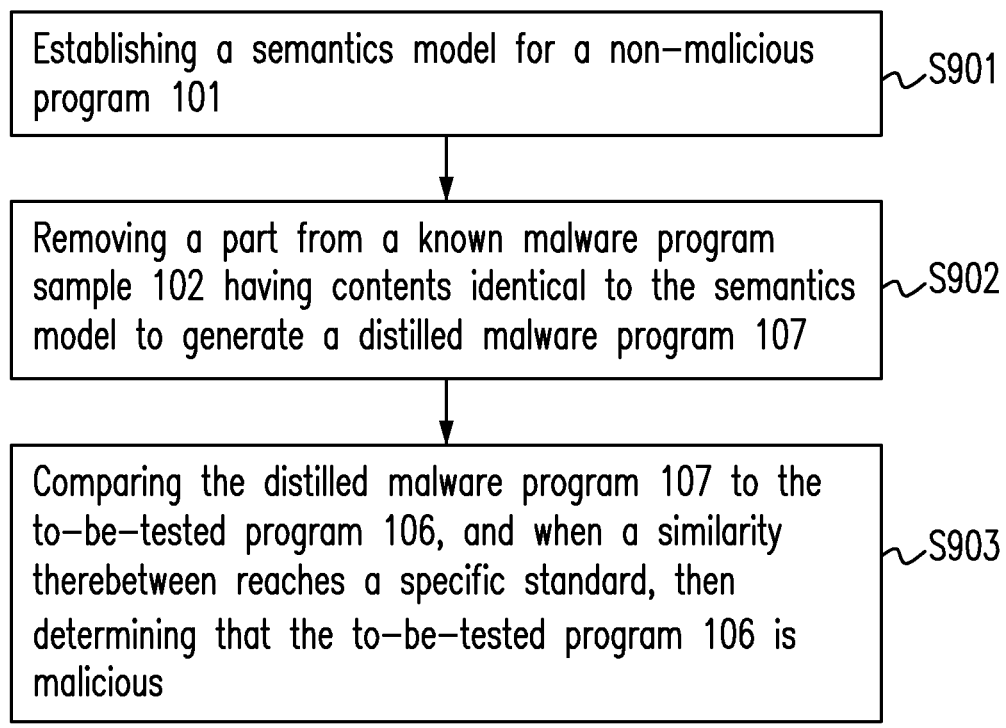
FIG. 9 shows the method for determining whether a to-be-tested program is malicious according to a third embodiment of the present invention.

Please refer to FIG. 9, which shows the method for determining whether a to-be-tested program 106 is malicious according to a third embodiment of the present invention. The method includes the steps of establishing a semantics model for a non-malicious program 101 (S901); removing a part from a known malware program sample 102 having contents identical to the semantics model to generate a distilled malware program 107 (S902); and comparing the distilled malware program 107 to the to-be-tested program 106, and when the similarity therebetween reaches a specific threshold, then determining that the to-be-tested program 106 is malicious (S903).

Please refer to Table 1 below, which shows a list of the numbers of the data flow elements in the known malware program sample 102 before and after distillation. It can be seen in Table 1 that after distillation of the known malware program sample 102, as the number of data flow elements decreases, the number of nodes decreases, and therefore the false alarm rate is lowered when detecting the malware program.

TABLE 1

| Malware program sample | Numbers of data flow elements | Distilled malware program | |
| --- | --- | --- | --- |
| | | Numbers of data flow elements | Numbers of nodes |
| DroidKungFu | 9 | 1 | 6 |
| AnserverBot | 4 | 2 | 5 |
| BaseBridge | 6 | 1 | 15 |
| Geinimi | 5 | 3 | 11 |
| Pjapps | 5 | 1 | 7 |
| GoldDream | 4 | 1 | 8 |
| DroidDreamLight | 5 | 1 | 4 |
| ADRD | 4 | 1 | 4 |
| DroidDream | 6 | 1 | 7 |
| jSMSHider | 9 | 2 | 15 |
| Zsone | 2 | 1 | 2 |
| Bgserv | 7 | 2 | 13 |
| BeanBot | 5 | 1 | 10 |
| GingerMaster | 4 | 1 | 16 |
| HippoSMS | 5 | 1 | 6 |

Please refer to Table 2 below, which shows a list of the detection rates of detecting the malware program. The detection rates include the detection rate 1, the detection rate 2 and the detection rate 3. The detection rate 1 is the first detection rate when the system 10 detects the to-be-tested program 106. After the to-be-tested program 106 is processed by the system 10, the new malware program sample is produced and then input to the system 10 for detection for the second time, and again for the third time. When the malware program sample 102 and the benign program 101 are more alike, the effect is more significant, and the first detection rate can be as high as 100%, e.g. the malware program samples jSMSHider and Zsone, which is the optimal result. Generally speaking, at the second time of detection, the detection rate 2 is higher than that of the first time, and at the third time of detection, the detection rate 3 is higher than that of the second time. For example, when detecting the malware program sample 102 Pjapps, the detection rate 3>detection rate 2>detection rate 1, and the average third detection rate 0.927>the average second detection rate 0.911>the average first detection rate 0.839. When the malware program sample 102 and the benign program 101 are less alike, the effect is less significant, and the detection rate is less optimal, e.g. the malware program samples 102 HippoSMS and DroidKungFu.

TABLE 2

| Malware program sample | Number of samples | Detection rate 1 | Detection rate 2 | Detection rate 3 |
| --- | --- | --- | --- | --- |
| DroidKungFu | 472 | 0.76 | 0.76 | 0.76 |
| AnserverBot | 186 | 0.99 | 0.99 | 0.99 |
| BaseBridge | 121 | 0.36 | 0.74 | 0.74 |
| Geinimi | 68 | 0.74 | 1 | 1 |
| Pjapps | 57 | 0.46 | 0.58 | 0.81 |
| GoldDream | 46 | 0.67 | 1 | 1 |
| DroidDreamLight | 45 | 1 | 1 | 1 |
| ADRD | 21 | 1 | 1 | 1 |
| DroidDream | 15 | 0.93 | 0.93 | 0.93 |
| jSMSHider | 15 | 1 | 1 | 1 |
| Zsone | 11 | 1 | 1 | 1 |
| Bgserv | 8 | 1 | 1 | 1 |
| BeanBot | 7 | 1 | 1 | 1 |
| GingerMaster | 3 | 1 | 1 | 1 |
| HippoSMS | 3 | 0.67 | 0.67 | 0.67 |
| Total and average | 1078 | 0.839 | 0.911 | 0.927 |

Embodiments

1. A computer-implemented method for distilling a malware program in a system, comprising steps of providing a benign program containing a first instruction set associated with a security; receiving the benign program and a known malware program sample; extracting the instruction set; tracing a program segment associated with the instruction set from the benign program using a plurality of data flow pathways; slicing the program segment into a plurality of independent data flow elements; identifying a partial program having elements identical to the plurality of independent data flow element from the known malware program sample; and removing the partial program from the known malware program sample to distill the malware program.

2. The method of Embodiment 1, further comprising comparing the plurality of independent data flow elements with the known malware program sample, to identify the partial program; and identifying the first instruction set by disassembling the bytecode of the benign program, wherein the instruction set comprises a privacy associated instruction set, a second instruction set unprotected by a Dalvik virtual machine, and a background automatic execution instruction set.

3. The method of any one of Embodiments 1-2, further comprising one of backward tracing source data of every data unit in the plurality of data flow pathways, and identifying every pathway used to execute the source data; and forward looking up the subsequently executed data of every data unit in the plurality of data flow pathways, and identifying every pathway used to execute the subsequently executed data to obtain the program segment.

4. The method of any one of Embodiments 1-3, wherein the first instruction set includes semantics, the method further comprising generalizing the semantics of the first instruction set.

5. The method of any one of Embodiments 1-4, further comprising inputting a to-be-tested program into the system in a detecting phase; dividing the to-be-tested program into n independent data flow elements, wherein the n-th data flow element of the n independent data flow elements includes an n-th flow chart, the distilled malware program includes m data flow elements, and the m-th data flow element of the m data flow elements includes an m-th flow chart; and comparing the similarity between the 1-st to n-th flow charts and the 1-st to m-th flow charts.

6. The method of any one of Embodiments 1-5, further comprising converting all data pathways in the n-th flow chart into a first set of values, and converting all data pathways in the m-th flow chart into a second set of values, wherein a first data pathway in the n-th flow chart is represented by a first value of the first set of values, and a second data pathway in the m-th flow chart is represented by a second value of the second set of values; obtaining a first count that values in the first set of values and the second set of values are the same, and obtaining a second count that values in the first set of values and the second set of values are different; and obtaining a similarity estimate by dividing the first count by the sum of the first count and the second count, when the similarity estimate is greater or equal to a specific threshold, and determining whether the n-th flow chart is similar to the m-th flow chart.

7. The method of any one of Embodiments 1-6, further comprising bipartite matching the n data flow elements and the m data flow elements; and depending how the n flow charts and the m flow charts are respectively similar to each other, and determining how malicious the to-be-tested program is.

8. A system for determining whether a to-be-tested program is malicious, wherein the system receives a benign program and a known malware program sample, comprising a semantics model extraction subsystem extracting a first instruction set associated with security in the benign program, tracing a program segment associated with the instruction set using a plurality of data flow pathways, and slicing the program segment into a plurality of independent data flow elements; a malware program distillation subsystem removing a part of the known malware program sample identical to the plurality of independent data flow elements to generate a distilled malware program; and a malware characteristics comparison subsystem comparing the distilled malware program and the to-be-tested program, and when the two programs having a similarity reaching a specific threshold, determining that the to-be-tested program is malicious.

9. The system of Embodiment 8, wherein the semantics model extraction subsystem comprises a security associated instruction extractor disassembling a bytecode of the benign program, wherein the instruction set comprises a privacy associated instruction set, a second instruction set unprotected by a Dalvik virtual machine, and a background automatic executing instruction set; a program slicer executing one of the following two operations: backward tracing source data of every data unit in the plurality of data flow pathways, and identifying every pathway used to execute the source data; and forward looking up subsequently executed data of every data unit in the plurality of data flow pathways, and identifying every pathway used to execute the sequential data, to obtain the program segment, wherein the program slicer slices the program segment into the plurality of independent data flow elements; and a data flow element generator generalizes semantics of the first instruction set, and output the plurality of independent data flow elements, wherein the system receives the benign program during a training phase, and receives the to-be-tested program during a detecting phase.

10. The system of any one of Embodiments 8-9, wherein the program slicer slices the to-be-tested program into n independent data flow elements, wherein the n-th data flow element of the n independent data flow elements includes an n-th flow chart, the distilled malware program includes m data flow elements, wherein the m-th data flow element of the m data flow elements includes an m-th flow chart.

11. The system of any one of Embodiments 8-10, wherein the malware characteristics comparison subsystem compares the similarity between the 1-st to n-th flow charts and the 1-st to m-th flow charts, converts all the data pathways in the nth flow chart into a first set of values, and converts all the data pathways in the mth flow chart into a second set of values, wherein a first data pathway in the n-th flow chart is represented by a first value of the first set of values, wherein a second data pathway in the m-th flow chart is represented by a second value of the second set of values, and when the first data pathway is identical to the second data pathway, the first value equals the second value.

12. The system of any one of Embodiments 8-11, wherein the malware characteristics comparison subsystem obtains a first count that values in the first set of values and the second set of values are the same, and obtains a second count that values in the first set of values and the second set of values are different, obtains a similarity estimate by dividing the first count by the sum of the first count and the second count, and when the similarity estimate is greater or equal to a specific threshold, and determines the n-th flow chart to be similar to the m-th flow chart.

13. The system of any one of Embodiments 8-12, wherein the malware characteristics comparison subsystem bipartite matches of the n data flow elements and the m data flow elements, and depending how the n flow charts and the m flow charts are respectively similar to each other, determines how malicious the to-be-tested program is.

14. A method for determining whether a to-be-tested program exhibits malicious behavior, comprising establishing a semantics model by extracting a first instruction set associated with security in a non-malicious program; generating a distilled malware program by removing a part of a known malware program sample having contents identical to the semantics model; and comparing the distilled malware program to the to-be-tested program, and when the two programs having a similarity reaching a specific threshold, determining that the to-be-tested program is malicious.

15. The method of Embodiment 14, further comprising tracing a program segment associated with the instruction set using a plurality of data flow pathways; executing one of the following two operations: backward tracing source data of every data unit in the plurality of data flow pathways, and identifying every pathway used to execute the source data; and forward looking up subsequently executed data of every data unit in the plurality of data flow pathways, and identifying every pathway used to execute the subsequently executed data to obtain the program segment; slicing the program segment into a plurality of independent data flow elements; generalizing the semantics of the instruction set; and comparing the plurality of independent data flow elements with the known malware program sample, and removing a part of the known malware program sample having elements identical to the plurality of independent data flow elements to generate the distilled malware program.

16. The method of any one of Embodiments 14-15, further comprising dividing the to-be-tested program into n independent data flow elements, wherein an n-th data flow element of the n independent data flow elements includes an n-th flow chart, the distilled malware program includes m data flow elements, and the m-th data flow element of the m data flow elements includes an m-th flow chart; comparing a similarity between the 1-st to n-th flow charts and the 1-st to m-th flow charts.

17. The method of any one of Embodiments 14-16, further comprising converting all the data pathways in the n-th flow chart into a first set of values, and converting all the data pathways in the m-th flow chart into a second set of values, wherein a first data pathway in the n-th flow chart is represented by a first value of the first set of values, and a second data pathway in the m-th flow chart is represented by a second value of the second set of values; obtaining a first count that the values in the first set of values and the second set of values are the same, and obtaining a second count rthat the values in the first set of values and the second set of values are different; and obtaining a similarity estimate by dividing the first count by the sum of the first count and the second count, and when the similarity estimate is greater or equal to a specific threshold, determining whether the n-th flow chart is similar to the m-th flow chart.

18. The method of any one of Embodiments 14-17, further comprising bipartite matching the n data flow elements and the m data flow elements, and when the n flow charts and the m flow charts are respectively similar to each other, determining that the to-be-tested program is malicious.

19. The method of any one of Embodiments 14-18, wherein the distilled malware program is inputted into the system as a new malware program sample; the specific standard comprises a similarity estimate and a respective similarity of a bipartite matching; and disassembling a bytecode of the non-malicious program, wherein the first instruction set comprises a privacy associated instruction set, a second instruction set unprotected by a Dalvik virtual machine, and a background automatic execution instruction set.

20. A method for determining whether a to-be-tested program is malicious, comprising steps of providing a non-malicious program containing an instruction set associated with a security; establishing a semantics model for the non-malicious program; removing a part of from a known malware program sample having contents identical to the semantics model to generate a distilled malware program; and comparing the distilled malware program to the to-be-tested program, and when a similarity there between reaches a specific standard, then determining that the to-be-tested program is malicious.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mobile-implemented method for distilling a malware program in an operating system including a Dalvik virtual machine, comprising steps of:
   providing a benign program to the operating system, wherein the benign program contains a first instruction set associated with a security;
   receiving the benign program and a known malware program sample in the operating system;
   extracting the first instruction set;
   tracing a program segment associated with the first instruction set from the benign program using a plurality of data flow pathways;
   slicing the program segment into a plurality of independent data flow elements;
   identifying a partial program having elements identical to the plurality of independent data flow elements from the known malware program sample; and
   removing the partial program from the known malware program sample to distill the malware program;
   comparing the plurality of independent data flow elements with the known malware program sample, to identify the partial program; and
   identifying the first instruction set by disassembling the bytecode of the benign program, wherein the first instruction set comprises a privacy associated instruction set, a second instruction set unprotected by the Dalvik virtual machine, and a background automatic execution instruction set.

2. The method of claim 1, further comprising one of:
   backward tracing source data of every data unit in the plurality of data flow pathways, and identifying every pathway used to execute the source data; and
   forward looking up the subsequently executed data of every data unit in the plurality of data flow pathways, and identifying every pathway used to execute the subsequently executed data to obtain the program segment.

3. The method of claim 2, wherein the first instruction set includes semantics, the method further comprising generalizing the semantics of the first instruction set.

4. The method of claim 1, further comprising:
   inputting a to-be-tested program into the operating system in a detecting phase;
   dividing the to-be-tested program into n independent data flow elements, wherein the n-th data flow element of the n independent data flow elements includes an n-th flow chart, the distilled android malware program includes m data flow elements, and the m-th data flow element of the m data flow elements includes an m-th flow chart; and
   comparing the similarity between the 1-st to n-th flow charts and the 1-st to m-th flow charts.

5. The method of claim 4, further comprising:
   converting all data pathways in the n-th flow chart into a first set of values, and converting all data pathways in the m-th flow chart into a second set of values, wherein a first data pathway in the n-th flow chart is represented by a first value of the first set of values, and a second data pathway in the m-th flow chart is represented by a second value of the second set of values;
   obtaining a first count that values in the first set of values and the second set of values are the same, and obtaining a second count that values in the first set of values and the second set of values are different; and
   obtaining a similarity estimate by dividing the first count by the sum of the first count and the second count, when the similarity estimate is greater or equal to a specific threshold, and determining whether the n-th flow chart is similar to the m-th flow chart.

6. The method of claim 4, further comprising:
   bipartite matching the n data flow elements and the m data flow elements; and
   depending how the n flow charts and the m flow charts are respectively similar to each other, and determining how malicious the to-be-tested program is.

7. A method for determining whether a to-be-tested program exhibits malicious behavior in a system including a Dalvik virtual machine, comprising:
  establishing a semantics model by extracting a first instruction set associated with security in a non-malicious program;
  tracing a program segment associated with the first instruction set using a plurality of data flow pathways;
  generating a distilled malware program by removing a part of a known malware program sample having contents identical to the semantics model;
  comparing the distilled malware program to the to-be-tested program, and when the two programs having a similarity reaching a specific standard, determining that the to-be-tested program is malicious;
  comparing the plurality of independent data flow elements with the known malware program sample, to identify the partial program; and
  identifying the first instruction set by disassembling the bytecode of the benign program, wherein the first instruction set comprises a privacy associated instruction set, a second instruction set unprotected by the Dalvik virtual machine, and a background automatic execution instruction set.

8. The method of claim 7, further comprising:
  executing one of the following two operations:
  backward tracing source data of every data unit in the plurality of data flow pathways, and identifying every pathway used to execute the source data; and
  forward looking up subsequently executed data of every data unit in the plurality of data flow pathway, and identifying every pathway used to execute the subsequently executed data to obtain the android program segment;
  slicing the android program segment into a plurality of independent data flow elements;
  generalizing the semantics of the first instruction set; and
  comparing the plurality of independent data flow elements with the known malware program sample, and removing a part of the known malware program sample having elements identical to the plurality of independent data flow elements to generate the distilled malware program.

9. The method of claim 8, further comprising:
  dividing the to-be-tested program into n independent data flow elements, wherein an n-th data flow element of the n independent data flow elements includes an n-th flow chart, the distilled malware program includes m data flow elements, and the m-th data flow element of the m data flow elements includes an m-th flow chart;
  comparing a similarity between the 1-st to n-th flow charts and the 1-st to m-th flow charts.

10. The method of claim 9, further comprising:
  converting all the data pathways in the n-th flow chart into a first set of values, and converting all the data pathways in the m-th flow chart into a second set of values, wherein a first data pathway in the n-th flow chart is represented by a first value of the first set of values, and a second data pathway in the m-th flow chart is represented by a second value of the second set of values;
  obtaining a first count that the values in the first set of values and the second set of values are the same, and obtaining a second count that the values in the first set of values and the second set of values are different; and
  obtaining a similarity estimate by dividing the first count by the sum of the first count and the second count, and when the similarity estimate is greater or equal to a specific threshold, determining whether the n-th flow chart is similar to the m-th flow chart.

11. The method of claim 10, further comprising bipartite matching then data flow elements and the m data flow elements, and when the n flow charts and the m flow charts are respectively similar to each other, determining that the to-be-tested program is malicious.

12. The method of claim 7, wherein:
  the distilled malware program is inputted into the system as a new malware program sample; and
  the specific standard comprises a similarity estimate and a respective similarity of a bipartite matching.

13. A method for determining whether a to-be-tested program is malicious in a system including a Dalvik virtual machine, comprising steps of:
  providing a non-malicious program containing an instruction set associated with a security;
  establishing a semantics model for the non-malicious program;
  tracing a program segment associated with the instruction set using a plurality of data flow pathways;
  removing a part of from a known malware program sample having contents identical to the semantics model to generate a distilled malware program;
  comparing the distilled malware program to the to-be-tested program, and when a similarity therebetween reaches a specific standard, then determining that the to-be-tested program is malicious;
  comparing the plurality of independent data flow elements with the known malware program sample, to identify the partial program; and
  identifying the instruction set by disassembling the bytecode of the benign program, wherein the instruction set comprises a privacy associated instruction set, a second instruction set unprotected by the Dalvik virtual machine, and a background automatic execution instruction set.

* * * * *